Sept. 5, 1967  B. VAN DER VOO  3,339,261
APPARATUS FOR THREADING CORES OF A MEMORY PLANE
Filed Sept. 3, 1964  2 Sheets-Sheet 1

INVENTOR.
BASTIAAN VAN DER VOO
BY
AGENT

Sept. 5, 1967   B. VAN DER VOO   3,339,261
APPARATUS FOR THREADING CORES OF A MEMORY PLANE
Filed Sept. 3, 1964   2 Sheets-Sheet 2

INVENTOR.
BASTIAAN VAN DER VOO
BY
AGENT ated Sept. 5, 1967

3,339,261
APPARATUS FOR THREADING CORES OF
A MEMORY PLANE
Bastiaan van der Voo, Eindhoven, Netherlands, assignor to North American Philips Company, Inc., New York, N.Y., a corporation of Delaware
Filed Sept. 3, 1964, Ser. No. 394,218
Claims priority, application Netherlands, Sept. 4, 1963, 297,519
6 Claims. (Cl. 29—203)

ABSTRACT OF THE DISCLOSURE

This disclosure relates to apparatus for assembling memory planes comprising interconnected apertured core members. The core members are positioned in an angularly aligned jig in substantially parallel rows and columns. Wire conductors for threading through the cores are aligned with the rows and columns by guide tubes. The angular alignment provides a gravity feed for threading the cores with the threading movement of the conductors being initiated and sustained by vibration of the guide tubes.

---

The invention relates to apparatus for manufacturing of storage elements or memory planes having apertured cores arranged in rows and columns. The rows and columns of cores are positioned in a threading jig and a wire conductor is threaded through the cores of each row and a wire conductor through the cores of each column. In the manufacture of storage elements, according to present practices, great accuracy and much time is required.

The invention has for its object to provide an apparatus by which threading can be carried out simply and rapidly. In accordance with the invention, a jig is arranged at an angle to the horizontal plane and the wire conductors are introduced to the jig through guide members, the centre lines of which register with openings of cores arranged in rows and columns. The members vibrate so that the wire conductors are caused to pass through the openings of the cores. The vibrations of the guide members set the wires moving, which thus find their way through the apertures of the cores of the rows and columns.

In the presently preferred embodiment of the invention the jig accommodating the annular cores is also vibrated, so that the cores perform so to say dancing movements in the jig. Thus the moving wire readily finds its way through the aperture of the vibrating core, so that the threading operation is further accelerated and all wires in one direction will be threaded in about one minute.

Apparatus for carrying out the method according to the invention is provided by a jig having recesses arranged in rows and columns for accommodating apertured cores and is characterized in that the jig is provided with guide members for wire conductors, the centre lines of which extend in the direction of the recesses arranged in rows and columns, there being provided suitable vibrating means for causing the jig and the guide members to vibrate.

In accordance with the preferred embodiment of the invention, the guide members are hollow tubes, the length of which is approximately equal to that of the wire conductors to be threaded through the core apertures.

However, it is contemplated that the guide members may be formed by grooves provided in a support and covered by a plate.

The above and other features, objects and advantages of the present invention will be fully understood from the following description considered in connection with the accompanying illustrative drawings.

Figure 1:
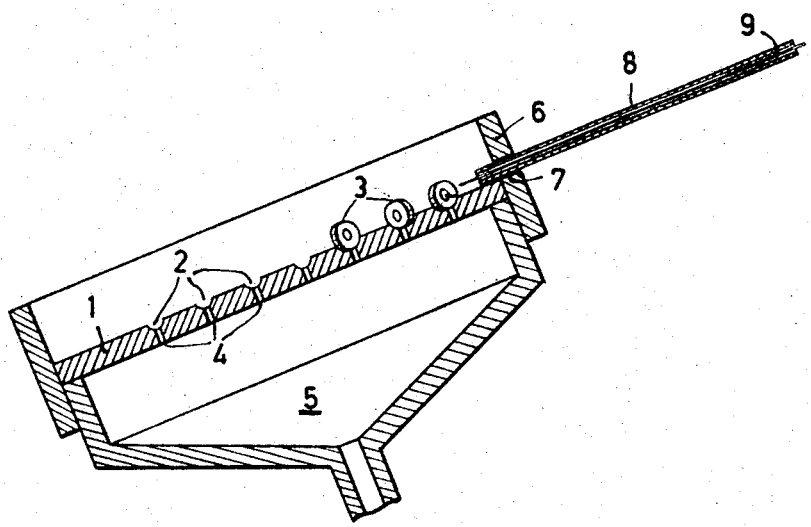
Figure 2:
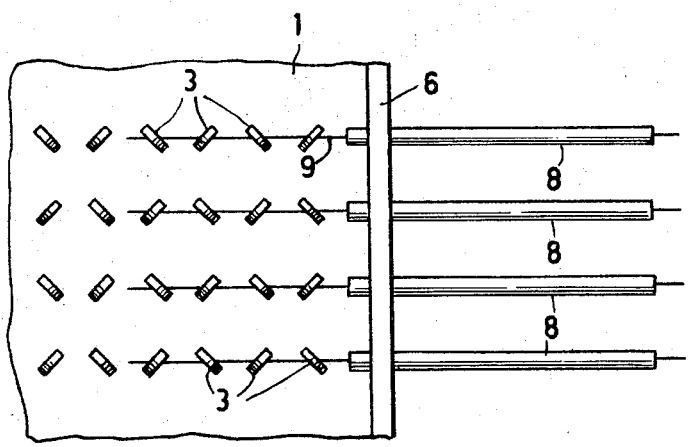
Figure 3:
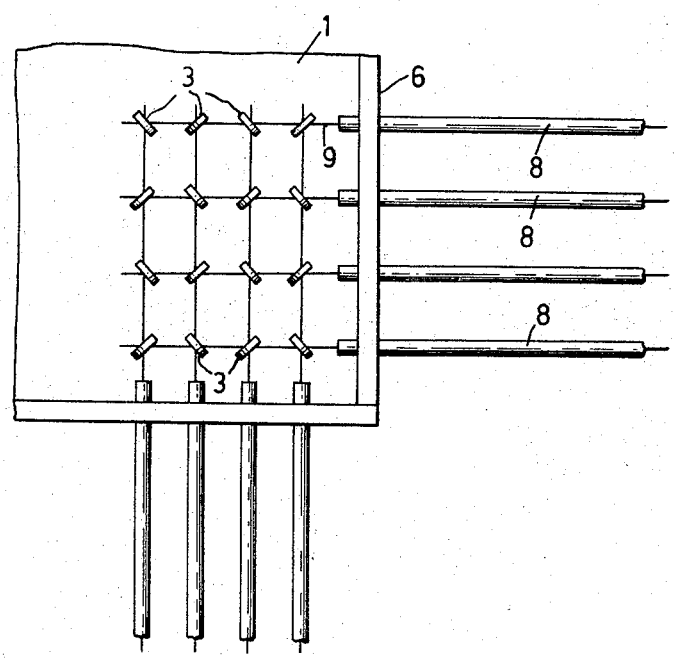

In the drawings:
FIG. 1 is a sectional view of a device for threading cores,
FIG. 2 is a plan view of part of the device shown in FIG. 1, and
FIG. 3 is a plan view of another embodiment of the device.

A jig 1 of non-magnetic material is provided with recesses 2, which are arranged in rows and columns and shaped in a form such that part of a core 3 can be held therein. The cores 3, which are preferably shaped in the form of rings, are made of ferrite material having a rectangular hysteresis loop as is well known. Channels 4 are provided between the bottoms of the recesses and the bottom side of the jig and terminate in a funnel-shaped space 5, with which an exhaust duct can be connected to a vacuum source.

A protruding rim 6 surrounds the jig and is provided with openings 7 for accommodating tubes 8. The tubes 8 are positioned such that their centre lines pass through the apertures of the cores 3 arranged in a row or a column in the jig 1. The assembly can be caused to vibrate by vibrating means of any suitable design.

A plurality of cores is arranged on the jig, which is then caused to vibrate. After vibration of the jig has been initiated a vacuum source is then connected with the funnel 5. The cores then fill up the recesses 2 of the jig and the vacuum prevents the cores from jumping out of the recesses. The conductor wires 9 are then introduced into the tubes 8, which are arranged in the directions of a row or a column and the jig disposed at an angle to the horizontal plane. When the jig and the tubes are then vibrated, the conductor wires 9 move towards the cores and find their way through the apertures thereof. Owing to the vibration, the cores do not stay in place in the recesses 2, but perform a dancing motion with respect to the surface of the jig 1. The vacuum prevents the cores from jumping free of the recesses. Owing to this so-called dancing motion, the conductor wires find their way very readily and rapidly through the apertures of the cores.

By the described method all wires are simultaneously threaded through the cores arranged in rows and this takes a time of not more than about one minute. Wires are threaded through the cores arranged in the columns in the same manner.

It will be apparent from the foregoing that not only can all the wires be inserted through the cores of a row at one time and subsequently through all the cores of a column, but also that all the wires in both the rows and columns may be inserted at the same time due to the dancing motion of the cores in the jig. In the latter, the jig is provided with tubes along two marginal sides and these tubes are disposed at an angle of approximately 45 degrees to the vertical plane bisecting the jig.

It will be obvious that wiring a storage element in the manner described above can be performed very rapidly with very little labor.

It is not necessary for the jig to be caused to vibrate during the threading operation. The tubes 8 may alternately be arranged in a holder which is separate from the jig and which alone is caused to vibrate. Threading in this way takes, however, slightly more time, since the wire can find its way through the apertures of the cores less rapidly. It is furthermore not necessary to use guide members for the wires 9 in the form of tubes. The guide members may also be formed by a support provided with grooves, which are covered by a plate.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. Apparatus for threading a memory plane having a plurality of ferrite cores having apertures therethrough, said cores being positioned to define a plurality of rows and columns comprising a jig means disposed at an angle to horizontal for holding said cores in said rows and columns, a plurality of wire conductor guide means connected with said jig means at the elevated side thereof, the longitudinal axis of each of said guide means being aligned with said openings in said cores of each of said rows and said columns, a plurality of wire conductors for threading said cores, said wire conductors being freely supported by said guide means, means for holding said cores in said rows and columns and means for vibrating said guide means whereby said conductors simultaneously thread through said cores.

2. Apparatus according to claim 1 wherein said means for holding said cores in said rows and columns comprises a negative pressure source connected with said jig, a plurality of recesses in said jig for receiving said cores and a conduit means connecting said recesses with said negative pressure source.

3. Apparatus according to claim 1 wherein said means for vibrating said guide means is connected with said jig for simultaneously vibrating said wires and imparting a dancing motion to said cores.

4. Apparatus according to claim 1 wherein said guide means comprise a plurality of tubes having a length substantially equal to the length of said rows.

5. Apparatus according to claim 2 wherein said guide means comprising a plurality of tubes are connected with said jig coaxial with each row and each column.

6. Apparatus for threading a memory plane consisting of a plurality of ferrite cores defining a plurality of substantially bisecting rows and columns at each core comprising a jig means disposed at an angle with the horizontal for loosely holding said cores in said rows and columns, a guide member coaxial with each said row and column along the elevated sides thereof, a wire conductor for threading said cores freely supported in said guide member, means for movably holding said cores in said rows and columns, and means for vibrating said jig and guide members for imparting motion to said cores and wires whereby said wires are threaded through the cores of said rows and columns simultaneously under the influence of gravity.

References Cited
UNITED STATES PATENTS

| | | | |
|---|---|---|---|
| 3,067,495 | 12/1962 | Chase | 29—203 |
| 3,129,494 | 4/1964 | Perkins | 29—203 |

JOHN F. CAMPBELL, *Primary Examiner.*

THOMAS H. EAGER, *Assistant Examiner.*